Nov. 12, 1968         W. B. WALKER         3,409,923
ADJUSTABLE PLATFORM AND RAMP UNIT
Filed April 29, 1966         8 Sheets-Sheet 3

INVENTOR.
WALTER B. WALKER
BY
Donnelly, Mentag & Herrington
ATTORNEYS

United States Patent Office 3,409,923
Patented Nov. 12, 1968

3,409,923
ADJUSTABLE PLATFORM AND RAMP UNIT
Walter B. Walker, 19603 Park Lane,
Grosse Ile, Mich. 48138
Filed Apr. 29, 1966, Ser. No. 546,332
13 Claims. (Cl. 14—71)

ABSTRACT OF THE DISCLOSURE

An apparatus which can be installed in a prepared pit in a floor area and which presents a deck surface level with the surrounding floor surface when it is in one position. In said one position it is capable of sustaining a superimposed loading or cross-over traffic. The apparatus includes a ramp portion and a hinged platform portion, with power means for elevating the platform portion to levels equal to the height of a truck or the like to permit a lift-truck to drive up the attached ramp and over the platform into the truck for unloading the same.

---

This invention relates to an adjustable platform and ramp assembly adapted for use in material handling between two different floor heights.

Material handling in industrial plants is a constant and costly problem. In many instances materials must be transferred not only between positions or points on one floor level, but between two different floor heights, as for example, such as loading or unloading semi-trailer vans, railroad cars or flat-beds by fork-lift trucks, and from a first floor to a basement, and so forth. Heretofore, such material handling problems have been solved by employing expensive and space consuming facilities such as large and expensive loading docks, stationary ramps, elevators and the like. Many small industrial plants do not have sufficient land area for such loading docks, ramps and elevators, and consequently, time consuming and costly substitutes are employed for transferring materials in such plants and for material receiving and shipping operations.

In view of the foregoing, it is an important object of the present invention to provide an adjustable platform and ramp assembly which is adapted to overcome the aforementioned problems of the prior art material handling means.

It is another object of this invention to provide an adjustable platform and ramp assembly which may be employed as a means for moving material between two different floors in an industrial building by lift-trucks, or the like, or it may be used to provide a means for use in loading or unloading semi-trailer vans or railroad cars with fork-lift trucks, and when not in use, it may be adjusted to a retracted position so that the space that it occupies may be used for other purposes.

It is another object of the present invention to provide an adjustable platform and ramp assembly which may be disposed in a flat position when not in use to provide a flat useable floor space, and which may be raised to provide a loading dock in a matter of seconds.

It is another object of the present invention to provide an adjustable platform and ramp assembly which may be used as a ramp to permit a fork-lift truck, or the like, to move material from one floor level of a plant to another, and which may be raised to an inoperative flat position whereby the floor space on one floor may be used for other purposes when the platform and ramp is not in use.

It is still another object of the present invention to provide a novel and improved adjustable platform and ramp assembly which is adapted for material handling operations, and which is simple and compact in construction, economical to manufacture, efficient in operation, and which may be prefabricated in a shop and delivered to the site of use for quick installation.

It is still a further object of the present invention to provide a novel adjustable ramp and platform assembly comprising, stationary support means, an elongated ramp, means hingedly connecting one end of said ramp to the support means, a vertically movable platform, means hingedly connecting the other end of said ramp to one end of said platform, and, means for raising and lowering said platform between vertically spaced positions.

Other objects, features and advantages of this invention will be apparent from the following detailed description, appended claims, and the accompanying drawings.

Figures 1, 2:
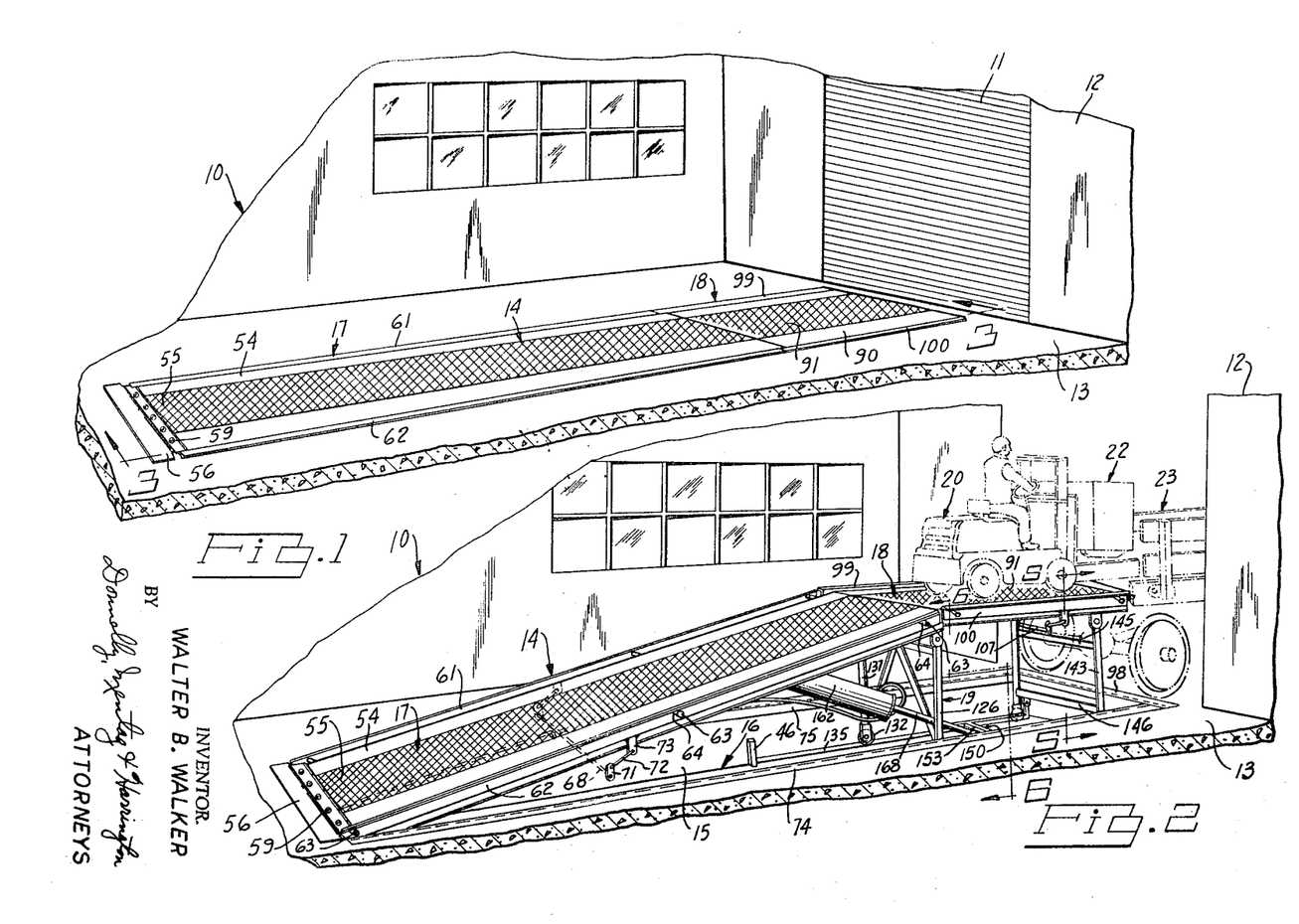
FIG. 1 is a fragmentary, perspective view of an industrial building, and showing a first embodiment of an adjustable platform and ramp unit made in accordance with the principles of the present invention, with the unit being shown in the flat or inoperative position.
FIG. 2 is a fragmentary, perspective view of the structure illustrated in FIG. 1, with parts removed for purposes of clarity, and showing the platform and ramp unit raised to an elevated operable position.

Referring now to the drawings, a first illustrative embodiment of the invention is shown in FIGS. 1 and 2 as being installed in the floor of a small industrial building and adapted to function as a materials handling loading and unloading means. In many small industrial buildings, the lot on which the building is located is not large enough to permit the building of a conventional loading dock or ramp without sacrificing useful and needed area which can be enclosed and used as part of the building area itself. Furthermore, many small industrial plants are hampered by various zoning laws which prohibit the building of loading ramps or stationary loading platforms on small plant areas.

The numeral 10 in FIGS. 1 and 2 generally illustrates a small industrial building which includes a wall 12 adjacent the street and in which is formed a loading entrance enclosed by a suitable door 11. The numeral 13 indicates the floor of the building in which is operatively installed an adjustable platform and ramp assembly 14 made in accordance with the principles of the present invention.

Figure 3:
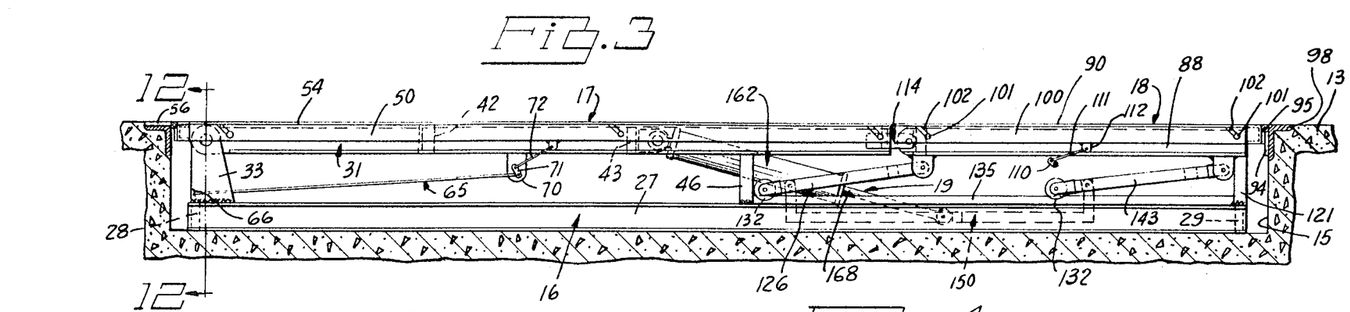
FIG. 3 is a fragmentary, elevational view of the structure illustrated in FIG. 1, taken along the line 3—3 thereof, and looking in the direction of the arrows.

As shown in FIGS. 1, 2, 3, 5 and 6, the illustrative embodiment is adapted to be operatively mounted in a pit 15 formed by any suitable manner in the plant floor. In FIGS. 2 and 3 the adjustable platform and ramp assembly is shown as including a supporting frame generally indicated by the numeral 16, a hinged ramp generally indicated by the numeral 17, an elevatable platform generally indicated by the numeral 18, and an elevating power means generally indicated by the numeral 19. FIG. 1 shows the platform and ramp assembly 14 in the retracted or recessed position in the pit 15, whereby the floor space in the plant may be used for other purposes than for material handling. FIG. 2 shows the platform and ramp assembly in an elevated, operative position to permit a fork-lift truck 20 to be employed to load material 22 into a truck 23, or the like, which is backed up to the outer end of the platform 18. In the raised position of FIG. 2, the ramp 17 assumes a position having approximately a 20% grade.

Figures 7, 8, 17, 20:
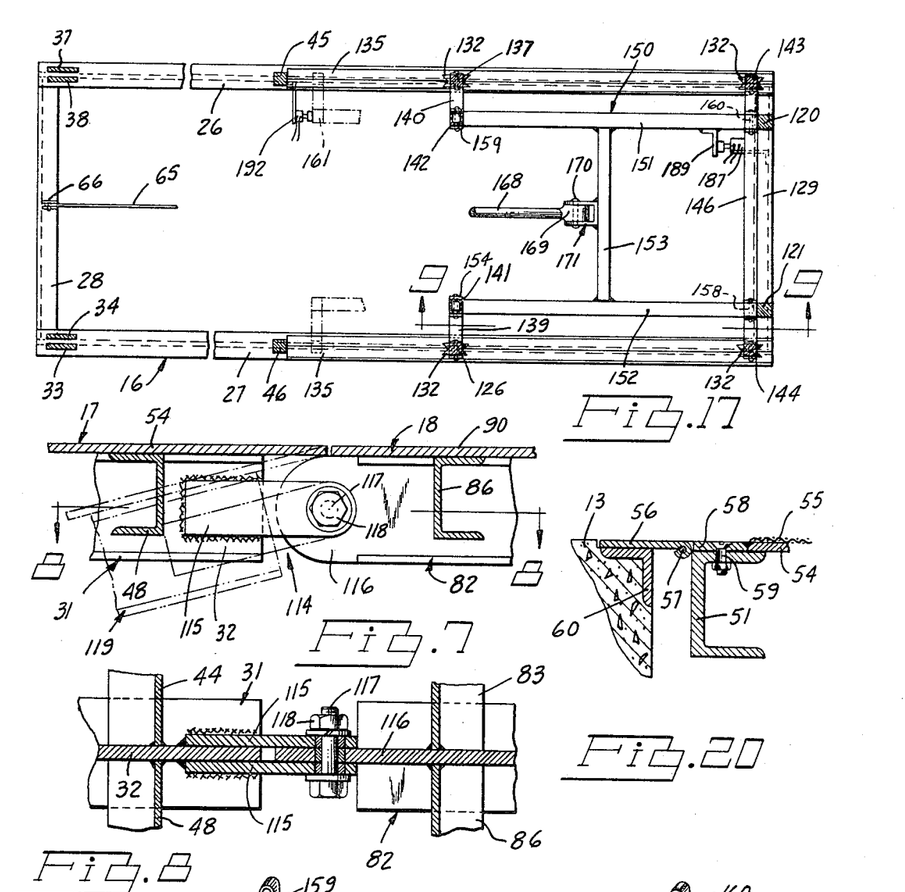
FIG. 7 is a fragmentary, enlarged, elevational section view of the structure illustrated in FIG. 4, taken along the line 7—7 thereof, looking in the direction of the arrows, and with the ramp and platform moved to the flat position.
FIG. 8 is a fragmentary, horizontal section view of the structure illustrated in FIG. 7, taken along the line 8—8 thereof, and looking in the direction of the arrows.
FIG. 17 is a broken, horizontal section view of the structure illustrated in FIG. 5, taken along the line 17—17 thereof, and looking in the direction of the arrows.
FIG. 20 is a fragmentary, enlarged, elevational section view of the structure illustrated in FIG. 4, taken along the line 20–20 thereof, looking in the direction of the arrows, and with the ramp moved to the flat position.

As shown in FIG. 17, the supporting frame 16 comprises a rectangular frame which includes a pair of spaced apart longitudinally extended I-beams 26 and 27 which are interconnected at the ends thereof by the transverse channels 28 and 29. The frame members 26, 27, 28 and 29 are fastened together by any suitable means, as by welding. The frame may be fixed in the pit 15 by any suitable means as by being cemented in place, or by suitable anchor bolts, or the like.

Figure 4:
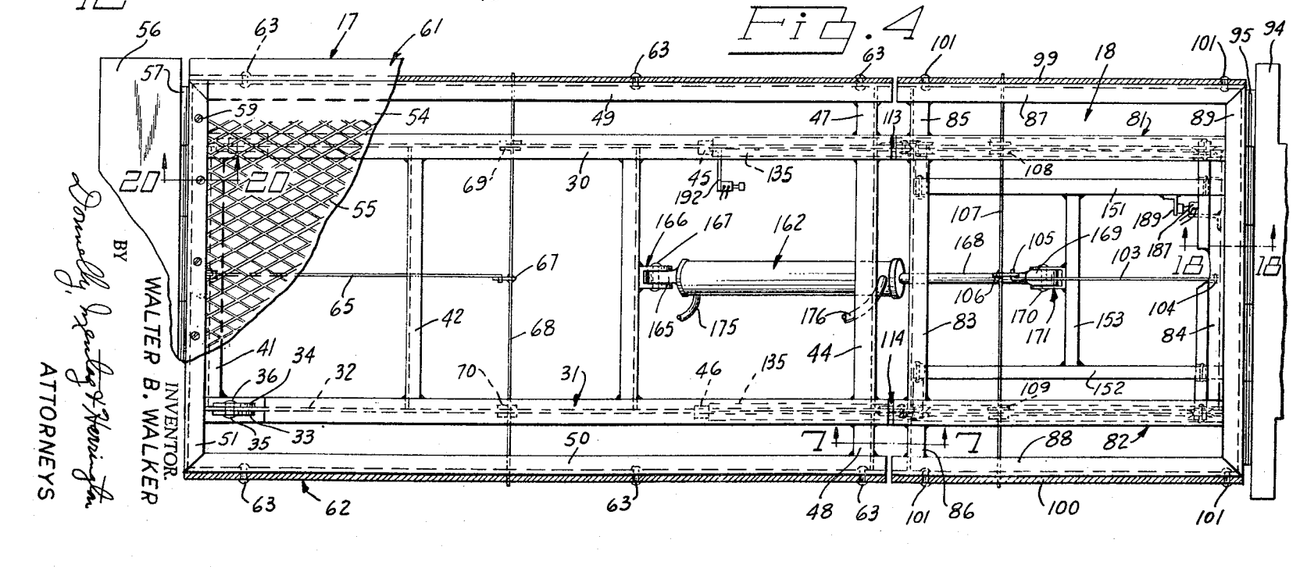
FIG. 4 is a plan view of the platform and ramp unit shown in FIG. 2, with the metal plate covering removed.
Figure 12:
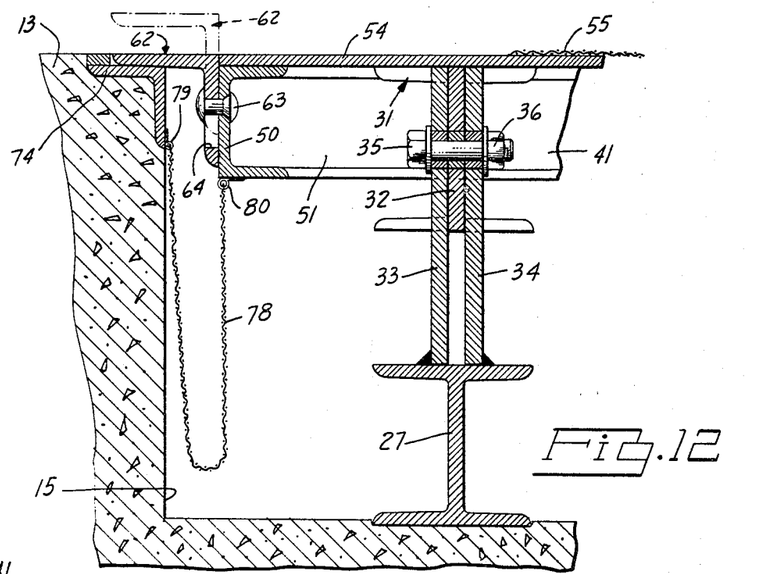
FIG. 12 is a fragmentary, enlarged, elevational section view of the structure illustrated in FIG. 3, taken along the line 12—12 thereof, and looking in the direction of the arrows.

As shown in FIGS. 3 and 4, the leading end or entrance end of the ramp 17 is hingedly connected to the front end of the frame 16. The ramp 17 comprises a pair of longitudinally extended, laterally spaced apart main support members 30 and 31 which are shown as being made in the form of I-beams. As illustrated in FIGS. 3, 4 and 12, the leading end of the I-beam 31 is hingedly supported on the support frame I-beam 27. The flanges of the I-beam 31 are removed at the leading end of the I-beam 31 and the web 32 is hinged between the upper ends of a pair of hinge plates 33 and 34, by any suitable means, as by the bolt 35 and nut 36. The lower ends of the spaced apart hinge plates 33 and 34 are secured to the top of the I-beam 27 by any suitable means as by welding. The leading end of the I-beam 30 is similarly hinged to the frame longitudinal I-beam 26 by a similar pair of hinge plates 37 and 38 as shown in FIG. 17.

As best seen in FIG. 4, the ramp I-beams 30 and 31 are fixedly interconnected by the transverse channel members 41, 42, 43 and 44. These channel members are fixed to the I-beams 30 and 31 by any suitable means, as by welding. When the platform and ramp assembly is in the lowered position shown in FIG. 3, the rear ends of the I-beams 30 and 31 are supported by the combination stop and support posts 45 and 46 which are shown in FIG. 17. The posts 45 and 46 are secured to the frame I-beams 26 and 27, respectively. It will be understood that any number of support members as 45 and 46 could be disposed between the leading end of the ramp and the positions of the support posts 45 and 46, as desired.

As shown in FIG. 4, the ramp 17 is provided at the rear end thereof with the transverse channel extensions 47 and 48 which are welded to the I-beams 30 and 31, respectively, and at their outer ends to the longitudinally extended channel members 49 and 50. The front ends of the channel members 49 and 50 are welded to the transverse channel frame 51 which is secured to the transverse channel 41 by any suitable means, as by welding.

The upper side of the ramp 17 is enclosed by a suitable metal plate 54 which is of sufficient strength, together with the other ramp structure, to support heavy loads. The ramp plate 54 may be provided with a suitable friction means as a strip of expanded metal 55 to provide traction for vehicles moving up and down the ramp. The expanded metal 55 would be secured to the surface of the ramp plate 54 by any suitable means, as by welding. As shown in FIGS. 4 and 20, the leading end of the ramp 17 is provided with a flip plate 56 which is secured by suitable spring loaded hinge means 57 to an attachment plate 58 which is secured to the transverse channel 51 by any suitable means, as by the screws 59. As best seen in FIG. 20, the flip plate 56 is adapted to rest on the upper face of an angle iron 60 which is mounted in the cement along the front end of the pit 15.

As shown in FIGS. 1 and 2, the ramp 17 is provided with a pair of angle irons 61 and 62 along the longitudinal side edges which are adapted to be raised along the side edges of the plate 54 when the ramp is in the raised position as shown in FIG. 2 to provide side rails or curbs. When the ramp 17 is in the retracted position of FIG. 1, the angle irons 61 and 62 are in a lowered position with the upper leg thereof flat with the plate 54.

As shown in FIGS. 2, 4 and 12, the right side curb angle iron 62 is slidably mounted for upward and downward movement on the outer face of the channel 50 by means of a plurality of rivets 63 which are fixed in the vertical wall of the channel 50 and which pass through sloping holes 64 formed through the vertical leg of the angle iron 62.

FIG. 12 shows the right side curb angle iron 62 in a lowered position and the raised position is shown in dotted lines. The left side curb angle iron 61 is similarly mounted and adapted to be raised and lowered in a similar manner. The ramp side curb rails 61 and 62 are adapted to be raised upwardly and downwardly by a rocker arm means shown in FIGS. 2, 3, 4, and 17. As shown in FIGS. 3, 4 and 17, a longitudinally disposed rod 65 is mounted under the ramp 17 and has its leading end hingedly connected at the point 66 to the supporting frame transverse channel 28. As shown in FIG. 4, the rear end of the rod 65 is turned sidewardly to form a transverse end member which is hingedly mounted through a suitable hole in one end of a lever 67 which has its other end welded to a transverse rod 68. The transverse rod 68 is rotably supported by a pair of downwardly extended plates 69 and 70 which are fixed to the lower sides of the ramp longitudinal I-beams 30 and 31, respectively.

As shown in FIG. 2, the right end of the transverse rod 68 is fixed to a lever 71 which is disposed below the ramp right side curb angle bar 62. The lever 71 is hingedly connected to the lower end of a rod 72 which in turn has its upper end hinged to a depending arm 73 fixed to the lower end of the curb angle rail 62 at an intermediate point thereon. The left end of the transverse rod 68 is similarly secured to the curb angle rail 61. It will be seen, that when the ramp 17 is moved from the lowered position of FIG. 1 to the raised position of FIG. 2, that the last described rod and rocker arm means will raise the curb angle bars 61 and 62 from their lowered positions of FIG. 1 to their raised positions of FIG. 2, relative to the ramp plate 54.

As shown in FIG. 12, the pit 15 is provided with a longitudinal angle 74 fixed in the cement along the right side of the pit, and the curb angle bar 62 is adapted to rest on the angle bar 74 when the ramp 17 is in the lowered position of FIG. 1. The left curb rail 61 is similarly adapted to rest on a pit left side angle bar 75, as shown in FIG. 2, when the ramp 17 is in a lowered position.

As illustrated in FIG. 12, a suitable curtain means may be provided along the sides of the ramp 17 when it is in the raised position to prevent objects from falling into the pit 15. One suitable curtain means is illustrated as comprising a wire mesh screen 78 which has one end secured at the point 79 to the pit longitudinal angle 74 and the other end to the lower side of the ramp longitudinal channel 50 at the point 80. The other side of the ramp 17 would be provided with a similar curtain which would automatically raise into position when the ramp is in the position shown in FIG. 2. The curtain 78 has been deleted from FIG. 2 for purposes of clarity.

The platform 18 is made in substantially the same manner as the ramp 17. In FIG. 4, the platform 18 includes a pair of longitudinally extended, laterally spaced apart, I-beams 81 and 82 which are aligned with the I-beams 30 and 31 of the ramp 17. The front of the I-beams 81 and 82 are interconnected by the transverse channel member 83, and the rear ends thereof are interconnected by the transverse channel member 84. The platform 18 further includes the channel extension bars 85 and 86 which are aligned with the front end channel 83 and which are fixed at the outer ends thereof to the longitudinally extended side channels 87 and 88, respectively. The rear ends of the longitudinal channels 87 and 88 are interconnected by a transverse channel 89. The last mentioned group of channels and I-beams are preferably welded together. The longitudinal channels 87 and 88 are aligned with the side channels 49 and 50, respectively, of the ramp 17.

Figure 5:
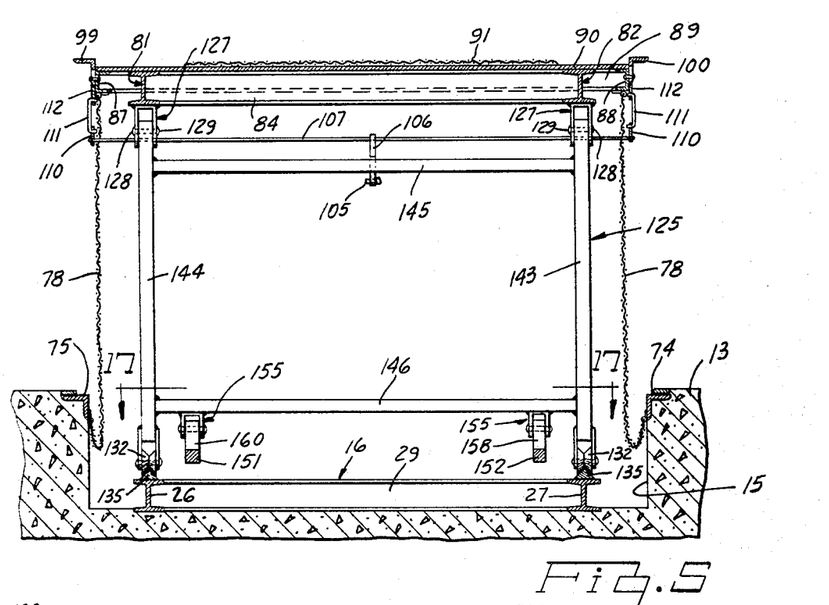
FIG. 5 is a fragmentary, enlarged, elevational section view of the structure illustrated in FIG. 2, taken along the line 5—5 thereof, and looking in the direction of the arrows.
Figure 6:
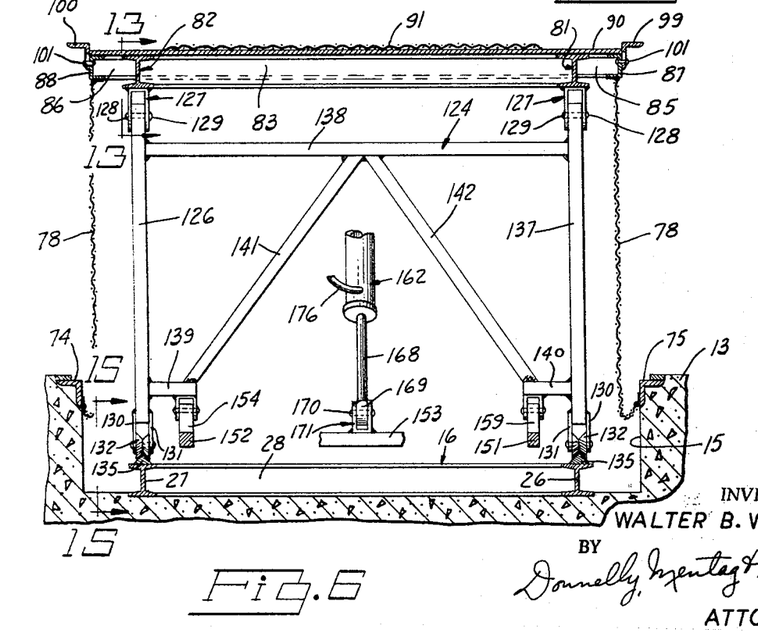
FIG. 6 is an enlarged, fragmentary, elevational section view of the structure illustrated in FIG. 2, taken along the line 6—6 thereof, and looking in the direction of the arrows.

As shown in FIGS. 1, 5 and 6 the upper side of the platform 18 is covered with a suitable plate 90 which is preferably made of metal and of a strength sufficient with the other platform members to support heavy loads. To provide traction, the platform plate 90 may be covered with a suitable friction means, as for example, the strip of expanded metal 91 which is welded to the top surface of the plate 90.

Figures 14, 18, 19:
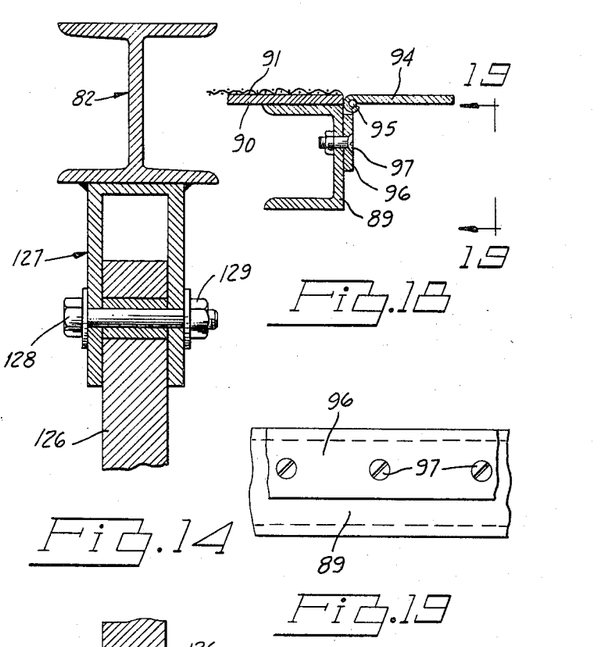
FIG. 14 is a fragmentary, elevational section view of the structure illustrated in FIG. 13, taken along the line 14—14 thereof, and looking in the direction of the arrows.
FIG. 18 is a fragmentary, enlarged, elevational section view of the structure illustrated in FIG. 4, taken along the line 18—18 thereof, and looking in the direction of the arrows.
FIG. 19 is a fragmentary, elevational view, with parts broken away, of the structure illustrated in FIG. 18, taken along the line 19—19 thereof, and looking in the direction of the arrows.

As shown in FIGS. 3, 4 and 18, the platform 18 is provided with a truck leveling plate 94 which is hinged at the rear end thereof with a suitable hinge means 95 to a retainer plate 96. The retainer plate 96 is fixedly secured to the vertical side of the transverse channel 89 by any suitable means, as by the screws 97. FIG. 3 shows the leveling plate 94 in the vertical storage position which it assumes when the platform 18 is in the retracted position of FIG. 1. As shown in FIG. 3, the rear end of the pit 15 is provided with a border or edge angle 98. As shown in FIGS. 5 and 6, the metal mesh curtain 78 is extended forwardly along each side of the platform 18 and is secured to the lower sides of the longitudinal channel members 87 and 88 by any suitable means.

As shown in FIGS. 1, 2 and 4, the platform 18 is also provided with the left and right side curb angle irons 99 and 100 which are adapted to be moved upwardly and downwardly relative to the cover plate 90 in the same manner as the side curb angle bars 61 and 62 for the ramp 17. As shown in FIG. 3, the platform right side curb angle iron 100 is adjustably mounted by means of the rivets 101 and the slots 102. The rivets 101 are fixed in the vertical wall of the side channel 88 and the angled or sloping slots 102 are formed through the vertical web of the angle iron 100. The left side curb angle iron 99 is similarly mounted.

The side curb angle irons 99 and 100 are raised and lowered by a rod and rocker arm means similar to that described hereinbefore for the ramp side curb angle irons. As shown in FIG. 4, a longitudinally extended rod 103 has the rear end thereof pivotally or hingedly mounted at the point 104 to the transverse support frame channel 29. The other end of the rod 103 is turned sidewise to provide a pivot end 105 which is pivotally mounted through one end of a rocker lever 106. The other end of the rocker lever 106 is fixed to a transverse rod 107 which is hingedly supported by the downwardly extended arms 108 and 109 which are secured to the lower side of the longitudinal I-beams 81 and 82.

As shown in FIGS. 3 and 5, the right end of the transverse rod 107 is fixed to the lower end of a rocker arm or lever 110 which has the upper end thereof pivotally connected to the lower end of a rod 111. The upper end of the rod 111 is hingedly connected to the arm 112 which is fixed to the lower edge of the right side curb angle iron 100. The left end of the transverse rod 107 is similarly connected to the lower edge of the left side curb angle iron 99. It will be seen that when the platform 18 is moved from the lowered position of FIG. 1 to the raised position of FIG. 2, the last described rod and rocker arm means will automatically raise the side curb angle irons 99 and 100 from the lowered positions of FIG. 1 to the raised positions of FIGS. 2 and 5. The rod 103 has been removed from FIG. 2 for purposes of clarity.

As shown in FIG. 4, the ramp 17 is hingedly connected to the platform 18 at the adjacent points indicated by the numerals 113 and 114. The hinge point 114 is shown in an enlarged illustration in FIGS. 7 and 8. As shown in FIGS. 7 and 8, the front ends of a pair of laterally spaced apart hinge plates 115 are welded to the rear end of the web 32 of the longitudinal ramp I-beam 31. The other end of the hinge arms 115 are pivotally connected to an extension of a web 116 at the rear end of the platform I-beam 82 by any suitable means as by a bolt 117 and a nut 118. The front end of the ramp I-beam 30 and the rear end of the platform I-beam 81 is also hingedly connected in a similar manner at the point indicated by the numeral 113 in FIG. 4. The numeral 119 in FIG. 7 indicates the dotted line position assumed by the ramp 17 relative to the platform 18 when platform 18 is in the raised position of FIG. 2.

As shown in FIG. 17, the support frame 16 is provided with a pair of combination stop and support posts 120 and 121 on the rear transverse channel 29, and these support posts are adapted to support the rear end of the platform 18 in the retracted position illustrated in FIG. 3.

The elevating power means 19 comprises a pair of longitudinally spaced apart rollably mounted support members 124 and 125 which have the upper ends thereof hingedly connected to the bottom of the platform 18 and the lower ends thereof connected to a power carriage, as more fully described hereinafter.

Figure 13:
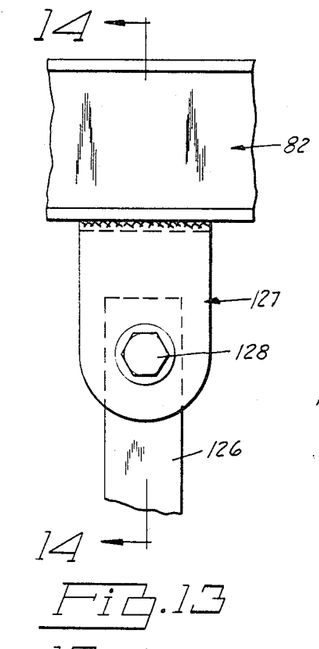
FIG. 13 is a fragmentary, enlarged, elevational view of the structure illustrated in FIG. 6, taken along the line 13—13 thereof, and looking in the direction of the arrows.

As shown in FIG. 6, the front elevating support member 124 comprises a right side vertical leg 126 which has its upper end pivotally connected to the lower side of the platform longitudinal I-beam 82. As best seen in FIGS. 13 and 14, a U-shaped shackle 127 is fixedly mounted on the lower side of the I-beam 82, as by welding, and includes a pair of spaced apart plates between which is received the upper end of the leg 126. The upper end of the leg 126 is hingedly mounted by any suitable means between the walls of the shackle 127, as by means of a bolt 128 and a nut 129.

Figure 15:
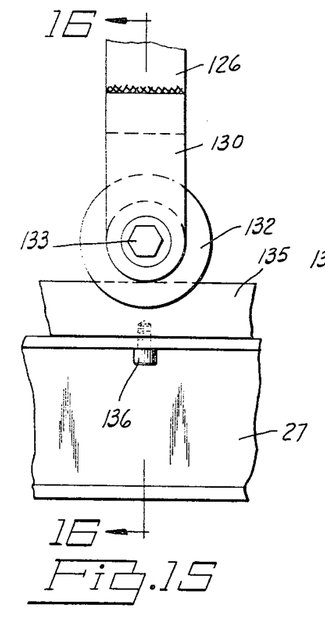
FIG. 15 is a fragmentary, enlarged elevational view of the structure illustrated in FIG. 6, taken along the line 15—15 thereof, and looking in the direction of the arrows.
Figure 16:
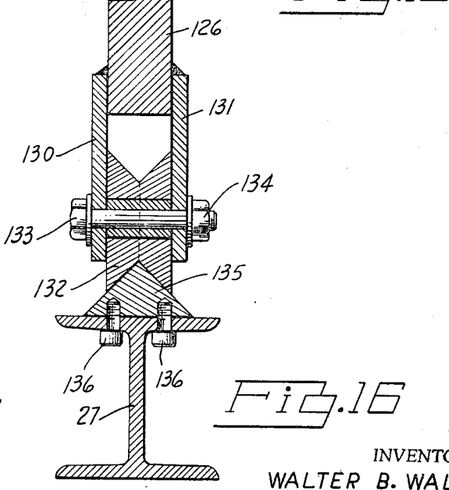
FIG. 16 is a fragmentary, elevational section view of the structure illustrated in FIG. 15, taken along the line 16—16 thereof, and looking in the direction of the arrows.

As shown in FIGS. 6, 15 and 16, the lower end of the leg 126 has fixedly connected thereto, as by welding, a pair of spaced apart plates 130 and 131 between which is rotatably supported a suitable roller 132, by any suitable means, as by means of a bolt 133 and a nut 134. The roller 132 is provided with a V-shaped periphery which is adapted to roll on an inverted V-shaped, longitudinally extended track rail 135 mounted on the top flange of the support frame I-beam 27. It will be understood that any other suitable roller and track means may be employed. The track 135 is secured to the I-beam 27 by any suitable means, as by the screws 136. As shown in FIG. 17, the track 135 extends from the combination stop and support post 45 to the rear end of the support frame I-beam 26.

As shown in FIG. 6, the front elevating member 124 further includes the left side leg 137 which is hingedly connected to the lower side of the platform I-beam 81 in the same manner as the upper end of the leg 126 was connected to the I-beam 82. The same reference numerals have been used to mark this hinged structure. The lower end of the leg 137 is provided with a roller 132 in the same manner as the leg 126. A track 135 is also disposed on top of the support frame longitudinal I-beam 26 and extends between the vertical combination stop and support post 46 to the rear end of the support frame 16.

As shown in FIG. 6, the upper ends of the legs 126 and 137 are interconnected by a cross bar 138 which is welded to these legs. Secured to the lower ends of the legs 126 and 137, as by welding, or the inwardly extended, horizontal arms 139 and 140, respectively. The inner ends of the arms 139 and 140 are fixedly connected, as by welding, to the lower ends of a pair of upwardly and inwardly sloping brace bars 141 and 142 which are fixed, as by welding, to an intermediate point on the lower side of the upper transverse brace bar 138.

As shown in FIG. 5, the rear elevating member 125 comprises a pair of spaced apart legs 143 and 144 which are hinged at their upper ends to the platform I-beams 82 and 81, respectively, in the same manner as the legs 126 and 137. The same reference numerals have been used to indicate such hinge structure. The lower ends of the legs 143 and 144 are also provided with rollers 132 which are adapted to roll on the tracks 135. The upper ends of the legs 143 and 144 are interconnected by a transverse brace bar 145, and the lower ends of these legs are interconnected by a similar transverve brace bar 146. The brace bars 145 and 146 are secured to the legs 143 and 144 by any suitable means, as by welding.

Figures 9, 10:
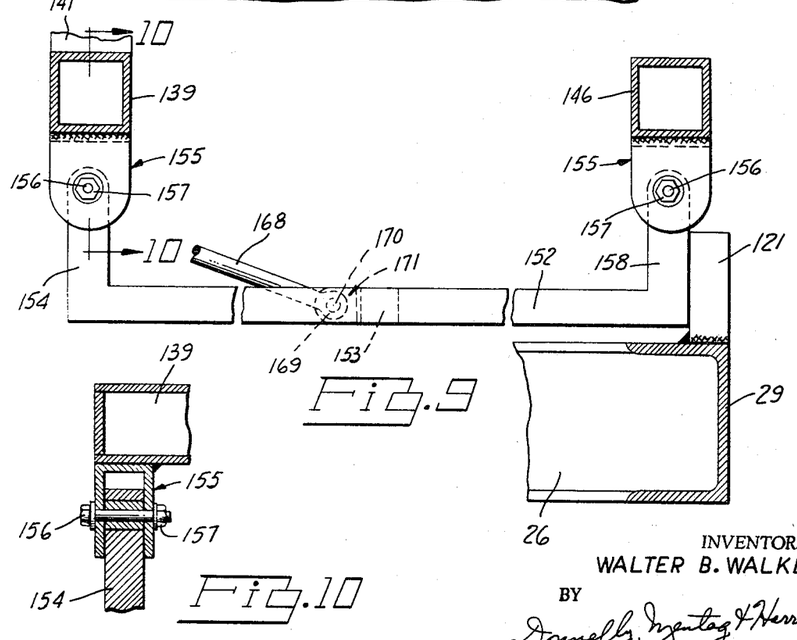
FIG. 9 is a fragmentary, enlarged, broken, elevational section view of the structure illustrated in FIG. 17, taken along the line 9—9 thereof, and looking in the direction of the arrows.
FIG. 10 is a fragmentary, elevational section view of the structure illustrated in FIG. 9, taken along the line 10—10 thereof, and looking in the direction of the arrows.
Figure 11:
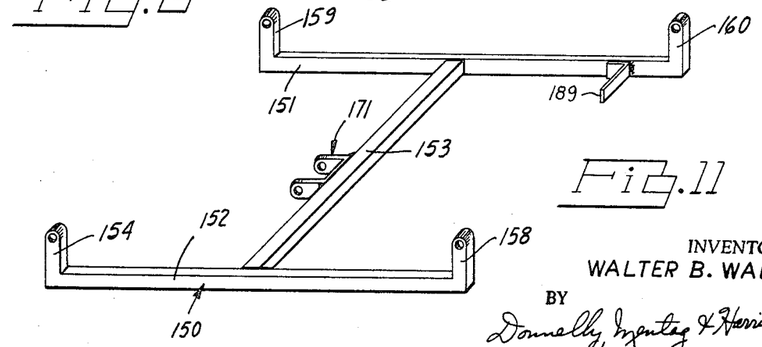
FIG. 11 is a perspective view of a carriage member employed in the structure illustrated in FIG. 2.

The elevating power means further includes a carriage, generally indicated by the numeral 150 as shown in FIG. 11. The carriage 150 includes the pair of longitudinally extended, parallel, spaced apart rails or bars 151 and 152 which are interconnected by the cross bar 153. The rail 151 is disposed along the left side of the platform 18, and the rail 152 is disposed along the right side of the platform 18. As shown in FIGS. 9 and 10, the right side carriage rail 152 is provided on the front end thereof with a vertically extended leg 154 which is hingedly mounted at the upper end thereof between a pair of spaced plates of a shackle or mounting bracket 155 fixed on the lower side of the arm 139. The shackle 155 is fixed to the arm 139 by any suitable means, as by welding. The carriage arm 154 is hinged to the shackle 155 by any suitable means, as by the bolt 156 and the nut 157. The rear end of the carriage rail 152 is also provided with a vertically extended leg 158 which is hingedly connected in the same manner as the leg 154 to the lower side of the cross bar 146. The left side carriage rail 151 is similarly provided with vertically extended legs 159 and 160 on the front and rear sides thereof which are hingedly connected to the arm 140 and cross bar 146, respectively, in the same manner as the carriage legs 154 and 158. FIGS. 5 and 6 show the hinged connections of the carrier rail legs to the front and rear elevating members 124 and 125.

It will be seen that when the elevating carriage 150 is moved to the rear end of the pit 15, as shown in FIG. 2, the platform 18 will be elevated. FIG. 17 also shows the carriage 150 in the position for elevating the platform 18. When the carriage 150 is moved to the left, as shown in FIG. 17, to the dotted line position 161, the platform 18 is moved to the lowered position shown in FIGS. 1 and 3.

It will be understood that the elevating carriage 150 may be moved between the raised and lowered positions by any suitable power means, as for example, by a hydraulic cylinder as indicated by the numeral 162 in FIG. 4. The hydraulic cylinder has the one end connected by means of a mounting arm 165 integrally between two plates of a mounting shackle 166 by means of a suitable bolt and nut means 167. The shackle 166 is secured to the ramp transverse channel members 43 by any suitable means, as by welding. The cylinder rod end of the cylinder 162 is disposed downwardly, and the cylinder rod 168 is provided with a connector member 169 which is hingedly connected by the hinge pin 170 to the shackle 171 fixed to the elevating carriage cross bar 153. It will be seen that when the piston rod 168 is moved into the cylinder, the elevating carriage will be moved to the left as viewed in FIG. 3 to move the ramp 17 and platform 18 to the lowered position. When the cylinder 162 is operated so as to move the cylinder rod 168 outwardly, the carriage 150 will be moved toward the rear end of the pit to move the ramp 17 and the platform 18 to the raised position of FIG. 2.

Figure 21:
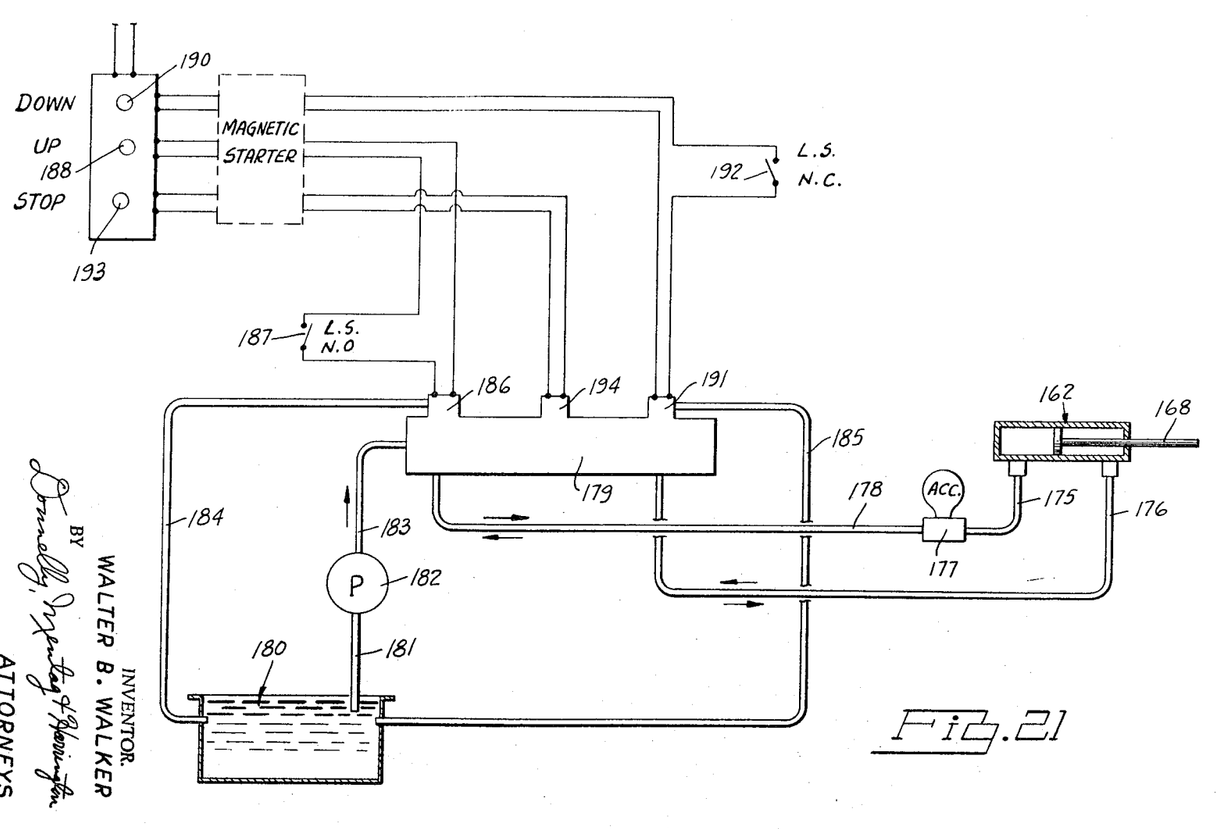
FIG. 21 is a schematic view of an illustrative electric and hydraulic control circuit for the embodiment of FIGS. 1 through 20.

The hydraulic cylinder 162 may be controlled by any suitable control circuit. One illustrative control circuit is shown in FIG. 21. The numerals 175 and 176 indicate the two fluid supply lines for supplying and exhausting hydraulic fluid to the opposite ends of the cylinder 162, as desired. The tubing 175 is connected by means of a suitable accumulator and the tubing 178 to one port in a suitable three-way hydraulic directional flow control valve, generally indicated by the numeral 179. The other cylinder supply and exhaust tubing 176 is connected to another port in the valve 179. Hydraulic fluid under pressure is supplied to the valve 179 by means of the pump 182 and the supply line 183. Pump 182 is supplied with fluid by means of the conduit 181 and the reservoir 180. The valve 179 has a pair of exhaust ports which are connected to the reservoir by the return lines 184 and 185. The flow control valve 179 is provided with a first solenoid 186 which is adapted to be operated by means of the limit switch 187 and the up button 188. Assuming that the elevating carriage 150 is in the dotted line position 161 shown in FIG. 17, the ramp 17 and the platform 18 will be in the collapsed position shown in FIGS. 1 and 3. If it is desired to move the ramp and platform to the elevated position shown in FIG. 2, the operator presses the button 188 and the solenoid 186 would be operated to operate the valve 179 to admit fluid under pressure into the cylinder 162 through the line 175 and exhaust fluid from the other end of the cylinder 162. When the carriage moves to the right as viewed in FIG. 4 and approaches the end of its travel, the switch operating arm 189 will engage the limit switch 187 to de-energize the solenoid 186. When it is desired to lower the platform 18, the down switch 190 is pressed to energize the valve solenoid 191. The elevating carriage 150 will then be moved to the left, as viewed in FIG. 17, to the reversal of the fluid into the cylinder 162. The elevating carriage 150 will then move to the dotted line position 161 and will be in a position so that the rear end of the carriage will engage the limit switch 192 to de-energize the solenoid 191 and stop the cylinder 162 from operating. An emergency stop switch 193 is provided to operate the solenoid 194 and the valve 179 to stop the operation of the cylinder 162 at any desired time.

Figures 22, 23, 24:
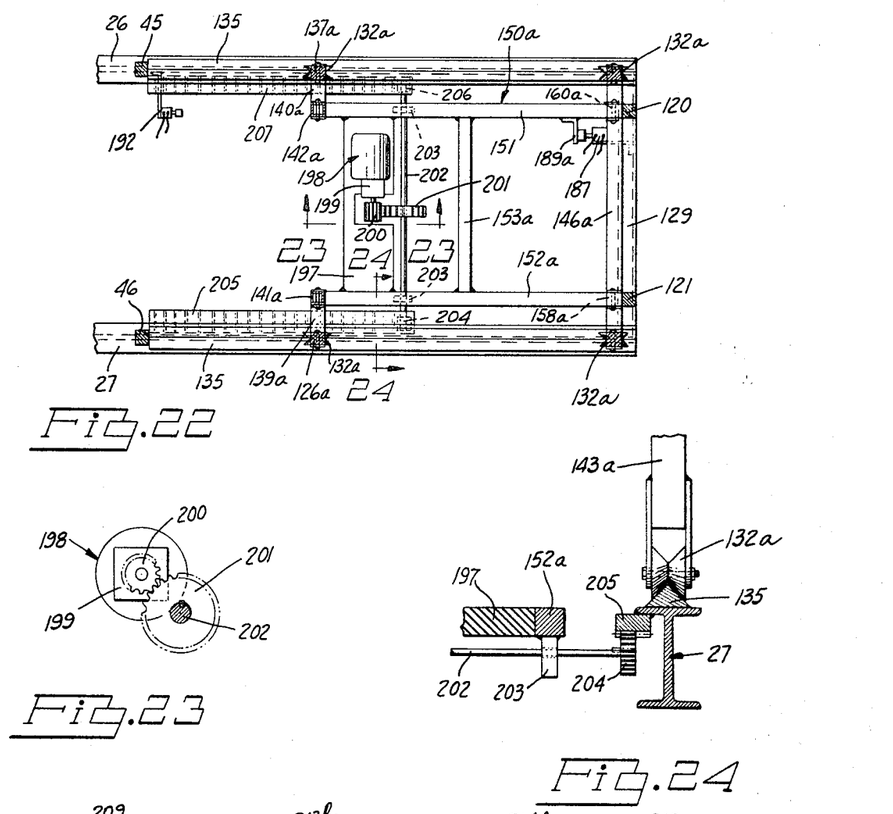
FIG. 22 is a schematic plan view of a second type of drive means for operating the platform and ramp assembly illustrated in FIGS. 1 through 4.
FIG. 23 is a fragmentary, elevational section view of the structure ilustrated in FIG. 22, taken along the line 23—23 thereof, and looking in the direction of the arrows.
FIG. 24 is a fragmentary, enlarged, elevational section view of the structure illustrated in FIG. 22, taken along the line 24—24 thereof, and looking in the direction of the arrows; and, FIG. 25 is a side elevational view of a second embodiment of the invention.

FIGS. 22, 23 and 24 illustrate a second type of power drive means for moving the elevating carriage, which in this embodiment is indicated by the numeral 150a. The parts of the elevating carriage 150a are the same as the first described embodiment and, accordingly, the corresponding parts are marked with the same reference numerals followed by the small letter a.

The carriage 150a is provided with a transverse support member 197 which is fixedly carried between the two longitudinal carriage members 152a and 151a. Operatively mounted on the support member 197 is a suitable electric drive motor 198 and a suitable gear reduction means 199. A gear reduction means 199 is provided with the drive gear 200 which is in turn meshed with the driven gear 201 mounted on the transverse drive shaft 202. As shown in FIG. 24, one end of the drive shaft is suitably journalled on a bracket 203 carried on the lower side of the carriage member 152a. The other end of the drive shaft would be suitably journalled on a similar bracket on the lower side of the carriage member 151a. As shown in FIG. 24, the one end of the drive shaft 202 is provided with a drive pinion 204 which is meshably engaged with the downwardly facing, longitudinally extended gear rack 205 fixed to the support frame I-beam 27. As shown in FIG. 22, the support frame I-beam 26 would be provided with a similar gear rack 207 which is adapted to be engaged by the gear 206 on the other end of the drive shaft 202. It will be seen that when the electric motor 198 is energized, the elevating carriage 150a may be moved between the same operating positions as described hereinbefore for the first embodiment of FIGS. 1 and 2 for raising and lowering the ramp 17 and the platform 18.

Figure 25:
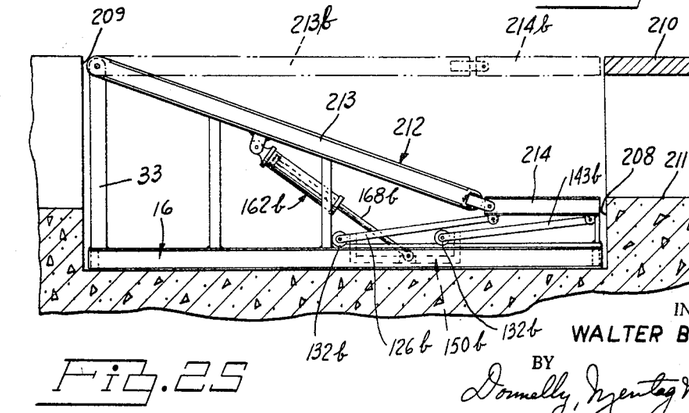

FIG. 25 illustrates the use of the ramp and platform assembly of the present invention for moving materials from one floor level to another floor level. The numeral 209 indicates an opening in the one floor indicated by the numeral 210, and the numeral 211 indicates the floor level of the floor below the floor 210. The embodiment of the type herein described would be mounted with the support frame 16 in a pit 208 formed in the floor 211. The various portions of the supporting frame would be made to the proper dimensions to provide for the increased height to which the platform is to be moved. The ramp and platform unit is generally indicated by the numeral 212 and it will be understood that it would be made in the same manner as the first described embodiment with the necessary changes to account for the height between the floor levels 210 and 211. The ramp is indicated by the numeral 213, and the platform by the numeral 214. The ramp and platform assembly is shown in solid lines in the lowered position so as to permit material moving devices to be passed downwardly or upwardly between the two floor levels. The numerals 213b and 214b indicate the raised position of the ramp and platform into an inoperative position. It will be seen that with a ramp and platform assembly of this type, that the floor level 210 may be used in the area over the opening 209 when the ramp and platform are raised. The platform 214 may be raised by the same elevating means as described hereinbefore for the first embodiment and the parts thereof have been marked with the same reference numerals followed by the small letter b. The elevating carriage may be elevated by either a hydraulic cylinder as previously described or by the electric motor drive means. For purposes of illustration the hydraulic cylinder 162b has been illustrated. It will be seen that when the ramp and platform are in the lowered position, the cylinder rod and piston would be in a retracted position, and when the cylinder 162b is operated so as to move the rod 168b out of the cylinder, the ramp and platform will be raised to the positions indicated by the numerals 213b and 214b.

It will be understood that the adjustable ramp and platform assembly of the present invention may be adapted for other uses than the uses described hereinbefore without departing from the principles of the present invention. For example, it will be readily apparent from the aforegoing description of the invention that the adjustable ramp and platform assembly may be used to raise or lower a load disposed on the platform from one level to another, if desired. It will be understood that the ramps and platforms may be made to any desired size. In one embodiment the ramp 17 was made to a size approximately twice the length of the platform 18.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. An adjustable ramp and platform assembly comprising:
   (a) stationary support means;
   (b) an elongated ramp;
   (c) means hingedly connecting one end of said ramp to the support means;
   (d) a vertically movable platform;
   (e) means hingedly connecting the other end of said ramp to one end of said platform; and,
   (f) means for raising and lowering said platform between vertically spaced positions, and said means maintaining the platform level during the movement between the vertically spaced positions.

2. An adjustable ramp and platform assembly as defined in claim 1, wherein:
   (a) said ramp and platform are each provided with a vertical safety curtain guard means along the sides thereof to enclose the openings created when the ramp and platform are in a raised position; and, (b) said safety curtain guard means is self-storing when the ramp and platform are lowered.

3. An adjustable ramp and platform assembly as defined in claim 1, wherein:
   (a) said stationary support means comprises a structural frame; and,
   (b) said one end of said ramp is hinged to one end of said frame.

4. An adjustable ramp and platform assembly as defined in claim 1, wherein:
   (a) said means for raising and lowering said platform and maintaining the platform level comprises an elevating means and a power means for moving said elevating means between a first position and a second position.

5. An adjustable ramp and platform assembly as defined in claim 4, wherein:
   (a) said power means comprises a hydraulically operated power means.

6. An adjustable ramp and platform assembly as defined in claim 5, wherein:
   (a) said hydraulically operated power means is interconnected between said ramp and said elevating member.

7. An adjustable ramp and platform assembly as defined in claim 4, wherein:

(a) said power means comprises an electrical drive means.

8. An adjustable ramp and platform assembly as defined in claim 1, wherein said means for raising and lowering said platform comprises:
   (a) a track means disposed beneath said platform;
   (b) a pair of spaced apart elevating members having the upper ends thereof hinged to the platform and the lower ends thereof rollably mounted on said track means; and,
   (c) means for moving the lower ends of said elevating members between a first position and second position.

9. An adjustable ramp and platform assembly as defined in claim 8, wherein:
   (a) said track means is mounted on said support means.

10. An adjustable ramp and platform assembly comprising:
   (a) stationary support means;
   (b) an elongated ramp;
   (c) means hingedly connecting one end of said ramp to the support means;
   (d) a vertically movable platform;
   (e) means hingedly connecting the other end of said ramp to one end of said platform;
   (f) means for raising and lowering said platform between vertically spaced positions;
   (g) said ramp and platform being each provided with curb means along each side thereof; and,
   (h) said ramp and platform being each further provided with means for moving said curb means upwardly and downwardly between an inoperative position and an operative position.

11. An adjustable ramp and platform assembly comprising:
   (a) stationary support means;
   (b) an elongated ramp;
   (c) means hingedly connecting one end of said ramp to the support means;
   (d) a vertically movable platform;
   (e) means hingedly connecting the other end of said ramp to one end of said platform;
   (f) means for raising and lowering said platform between vertically spaced positions comprising:
      (1) a track means disposed beneath said platform;
      (2) a pair of spaced apart elevating members having the upper ends thereof hinged to the platform and the lower ends thereof rollably mounted on said track means; and,
      (3) means for moving the lower ends of said elevating members between a first position and second position including an elevating carriage hingedly connected between the lower ends of said elevating members, and, power means for moving said elevating carriage between a first position and a second position.

12. An adjustable ramp and platform assembly as defined in claim 11, wherein:
   (a) said power means comprises a hydraulically operated power means.

13. An adjustable ramp and platform assembly as defined in claim 11, wherein:
   (a) said power means comprises an electrical power drive means.

References Cited

UNITED STATES PATENTS

| | | | |
|---|---|---|---|
| 2,449,829 | 9/1948 | Agren | 14—72 |
| 3,051,340 | 8/1962 | Ely | 214—512 |
| 3,059,258 | 10/1962 | Holleen | 14—71 |
| 3,170,179 | 2/1965 | Layne | 14—71 |

FOREIGN PATENTS 162,885  5/1955  Australia.

JACOB L. NACKENOFF, *Primary Examiner.*